Nov. 8, 1932. N. A. DRAIM 1,886,874
QUICK ACTING CLAMP
Filed Aug. 3, 1931
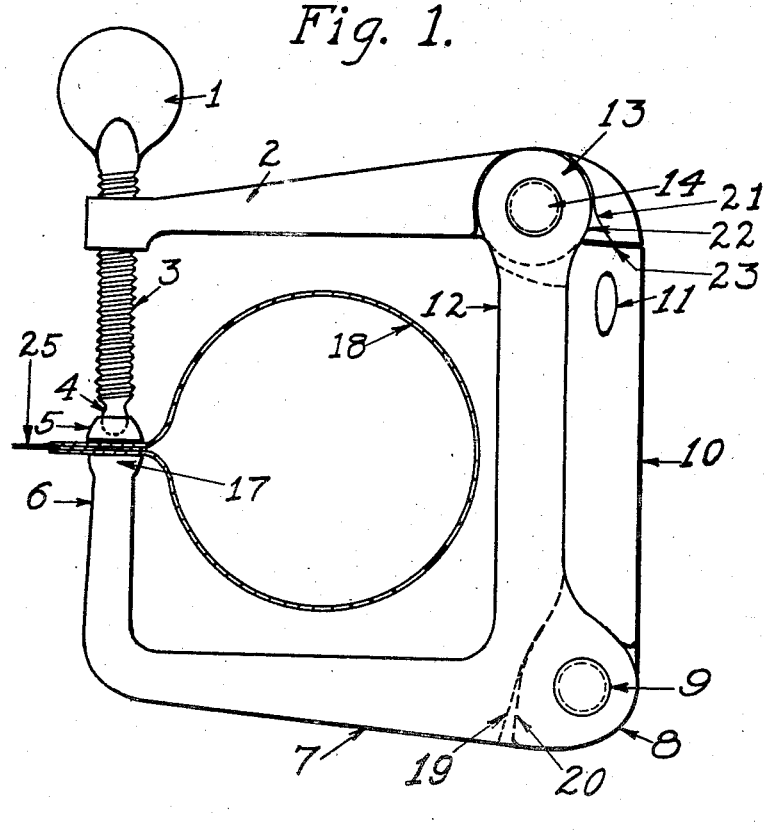
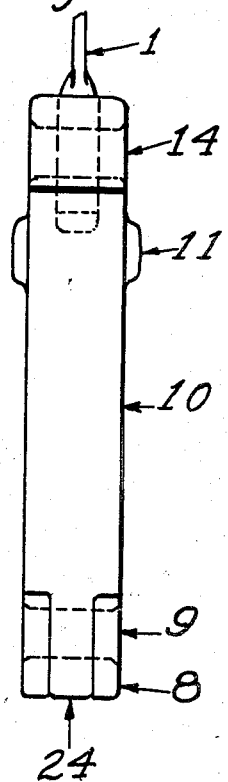
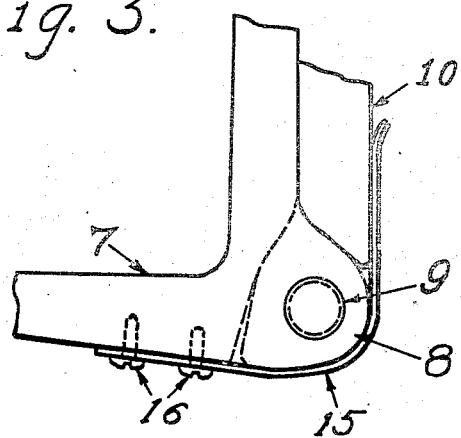
Nicholas A. Draim.
INVENTOR
BY Thomas E. Scofield
ATTORNEY Patented Nov. 8, 1932

1,886,874

UNITED STATES PATENT OFFICE

NICHOLAS A. DRAIM, OF SILVER SPRING, MARYLAND

QUICK ACTING CLAMP

Application filed August 3, 1931. Serial No. 554,800.

This invention relates to clamps, and more particularly to C-clamps of the quick acting type. In shop assembly it is frequently necessary to clamp work together prior to permanently fastening it by means of rivets, screws, nails, brads, bolts, glue, or solder and the like. Very often part of the assembly consists of angles, bulbs, T's, Z's or similar enlarged sections over which the jaws of the clamp must be passed. To do this with an ordinary clamp the threaded stem must be unscrewed sufficiently, and then screwed down again to exert a clamping action on the work. This involves considerable time. For example, in an airplane assembly shop in which all-metal aircraft are manufactured, several hundred C-clamps are used to hold the framework together during the process of applying the skin plating and fastening the structural members together. It will readily be appreciated that the time consumed in screwing and unscrewing ordinary C-clamps throughout the maximum width of the work in a large plant will be great. This results in slowing down production and increasing operating costs.

Many inventors have devised means for overcoming the disadvantages of the ordinary C-clamp. It has been proposed to utilize a sliding arm. This entails the necessity of using an elongated guide bar and has the further disadvantage of not being positive in its action. Some devices use a split nut on the threaded member, which arrangement is not only weak but it is found that the threads wear rapidly. Other modifications use various types of quick releasing screw or quick releasing threaded bores. Certain devices contain interrupted screw mechanisms in the threaded bore. Still others use a toggle locking parallel motion mechanism. These have been found more or less expensive to manufacture.

One object of this invention is to overcome the difficulties and disadvantages inherent in existing types of clamps.

Another object of my invention is to provide a clamp which is simple, easy and cheap to manufacture, which is positive in its action, which is light in weight and yet quick acting in its nature.

Still another object of my invention is to produce a quick acting clamp which can be made in all sizes without difficulty and yet be as strong as an integral clamp.

A further object of my invention is to reduce the length of the screw-threaded member and yet permit the clamp to pass over work of unusual width and of various structural shapes.

Yet another object of my invention is to provide a quick acting clamp which is as compact as an ordinary C-clamp, in order that it may be inserted in the interior of complicated structures without special interference.

Another object of my invention is to provide a quick acting clamp which is semi-automatic in its action.

A still further object of my invention is to produce a construction which is susceptible of modification in order that either the screw carrying arm or the anvil carrying arm may be made pivoted to permit quick acting operation and increased jaw opening.

Further objects will appear from the detail description taken in connection with the accompanying drawing in which are disclosed an illustrative embodiment of this invention; it will, however, be understood that this invention is susceptible of various embodiments.

In the accompanying drawing

Figure 1 is a side elevation of a clamp embodying my invention.

Figure 2 is an end view of the clamp.

Figure 3 is a butt segment of my clamp showing a modification.

Generally stated this invention comprises a clamp having a pivoted arm, which may be either the screw carrying or the anvil supporting member, pin-jointed to the opposed, stationary, supporting frame-work, locked into position by means of a rear, pivoted, compression locking member. It is to be understood, however, that any suitable locking means, such as pin-jointed toggle member, may be employed to lock the arm in operative position. The locking member is optionally provided with a resilient means, such as a spring, acting to snap it into locking position, thus rendering the clamp semi-automatic in its action.

More particularly, having reference to the accompanying drawing 1 represents the winged head of the pressure exerting screw 3. This head may be a knurled knob or a sliding or fixed pin lever. 2 is the pivoted arm having a threaded bore through which the screw 3 passes. The arm 2, however, may be made fixed and the anvil-carrying arm 7, may be movable. The arm 2 has a recessed portion nesting in the forked end 13 of the stationary frame 12. The pin 14 is a hardened steel pivot having burred ends securing it in place. The rear end of the recessed portion provides a shoulder 21 which coacts with the fillet 22 of fork 13, to limit the upward angular displacement of the arm 2. Locking arm 10 is equipped with a tongue end 24 fitting within bifurcated butt end 8 of frame 12, forming with pin 9, similar to pin 13, a pivot. Surface 20 on the tongue engages surface 19, the bottom of the recess in the frame when the member 10 is in open position and prevents further pivotal movement. The locking arm 10 is provided with means to facilitate drawing the locking arm to the rear, until surface 23 is clear of the butt end of the arm 2, thus permitting the arm to swing upwardly. Small projections 11 are shown in Figures 1 and 2, although knurling, indentations or other suitable grasping means may be employed. The outer end of arm 10 may be made with a slight angle so that when clamping action is exerted a thrust will be created tending to holding the locking arm in locking position. Referring now to Figure 3, stationary opposed arm 7 is drilled and tapped for the reception of screws 16 to hold leaf spring 15 in place. As will be readily seen this spring biases locking arm 10 to locking position. It will be understood that any suitable resilient means may be employed to exert a closing action on the locking arm, such as an endless annular coil spring or a spring-pressed plunger housed in arm 7. It will readily be appreciated that leaf spring 15 may be secured to arm 7 by any suitable means. Column 6 supporting anvil 17 may be made of any desired length, a feature which is not possible with the ordinary clamp, to accommodate varying structural shapes. Screw 3 terminates in ball 4 which fits in a socket in shoe 5 enabling it to exert an equalized pressure-contact.

In operation, it being desired, for example, to secure bulb stiffener 18 to frame web 25, the spacing between 5 and 17 having been set approximately, during the course of similar work, the locking arm 10 is drawn to the rear by the fingers of the operator with the aid of projections 11 until the arm reaches its limiting position. Then the arm 2 is free to be swung upwards to form a large opening. The gap thus formed permits the clamp to be passed over the wide section without further manipulation of the threaded stem 3. The operator then swings the arm 2 downwards and closes locking arm 10, a few turns of the screw now being sufficient to clamp the work in place. To unlock, all that is necessary is to loosen the clamping screw a few turns and draw the locking arm to the rear as previously described. When spring means are fitted, the locking arm 10 is held in open position by the toe of arm 2. When it is desired to close the clamp, all that is necessary, is to swing the arm 2 downwardly, allowing locking member 10 to snap into locking position, thus rendering the clamp semi-automatic in action. If desired, spring means of a similar nature may be fitted to arm 2, urging it to open position—so that when the locking member is drawn rearwardly, the arm 2 will move to open position.

It will be understood that certain features, sub-combinations and operations are of utility and may be employed without reference to other features and sub-combinations; that is contemplated by and is within the scope of the appended claims. It is further obvious that various changes may be made in details, within the scope of the claims appearing below, without departing from the spirit of this invention; it is, therefore, to be understood that my invention is not to be limited to the specific details shown and described.

Having thus described my invention, what I claim is:

1. A clamp comprising two arms and a pivot for one arm so supported from the other arm that the two arms may assume a position directly opposed to each other extending in the same direction from the pivot the pivoted arm having an extension beyond the pivot constituting a lever, a locking bar constituting a strut abutment pivoted to the support for the pivot first mentioned at such a distance from the first named pivot as to be capable of swinging entirely out of the range of movement of the extension of the first named pivoted arm and also of swinging into engagement with said extension to limit the swing of said first mentioned arm to a position substantially parallel to the pivot carrying arm and adjustable means carried by the free end of one of the arms for producing pressure between said arms.

2. A clamp comprising in combination a pair of arms, one of said arms pivotally supported by the other intermediate its length constituting a lever, a locking bar pivoted to the supporting arm at such a distance from the first named pivot as to be capable of swinging entirely out of the range of movement of said lever and also of swinging into engagement with one end thereof to limit its swing to a position substantially parallel to the supporting arm, and adjustable means carried by the free end of one of the arms for producing pressure between said arms.

3. A clamp according to claim 2 in which the free end of the locking bar is so inclined that pressure upon the lever arm locks the locking bar in locking position.

4. A clamp according to claim 2 in which said locking bar is urged to locking position by a spring.

In witness whereof, I hereunto subscribe my name this 16th day of July, 1931.

NICHOLAS A. DRAIM.